United States Patent Office 3,185,664
Patented May 25, 1965

3,185,664
HIGH MOLECULAR WEIGHT LINEAR POLYCARBONATES OF DI(HYDROXYPHENYL)-METHANES
André Jan Conix, Hove-Antwerp, Belgium, assignor to Gevaert Photo-Producten N.V., Mortsel, Belgium, a Belgian company
No Drawing. Filed Jan. 26, 1962, Ser. No. 169,116
Claims priority, application Great Britain, Jan. 27, 1961, 3,328/61
1 Claim. (Cl. 260—47)

The invention relates to thermoplastic materials with special properties; more particularly it relates to the preparation of new polycarbonates.

It is known from Schnell, Angew. Chem. 68, 638 (Oct. 21, 1956) to prepare polycarbonates by phosgenation among others of di(4-hydroxyphenyl)-methane. The only propery of this particular polycarbonate indicated by Schnell is the melting point which he states is situated "far above 300° C." Because of this high melting point which is very close to its decomposition temperature, this polycarbonate cannot be worked up from the melt into shaped articles. From our own investigation it appears further that this polycarbonate is insoluble in low boiling organic solvents such as methylene chloride. Accordingly films cannot be cast from solutions of this polycarbonate in such solvents. Furthermore the polycarbonate shows a very strong tendency to crystallization so that even if films are cast from solutions using high boiling solvents the films have a milky appearance and are brittle.

In British patent application 883,619 a method is dt-scribed for the production of polycarbonates by condensing of di(hydroxyaryl)-alkanes with phosgene or with dichloroformates of the di(hydroxyaryl)-alkanes. It is stated that mixtures of different di(hydroxyaryl)-alkanes may be used. The list of suitable compounds comprises the different isomers of di(hydroxyphenyl)methane. Further cross-linked polycarbonates are claimed obtained by heating them with formaldehyde, paraformaldehyde, hexamethylene tetramine and polyphenols.

Surprisingly we have found that polycarbonates obtained by phosgenation of mixtures of well defined composition of isomeric di(hydroxyphenyl)-methanes possess softening points below 200° C., are soluble in low boiling organic solvents, e.g. in methylene chloride, possess an exceptionally high elongation at break and that these polycarbonates may be insolubilized in organic solvents by heating them in an oxygen containing atmosphere.

According to the present invention high molecular weight linear polycarbonates are provided which are the condensation products of a mixture of isomeric di(hydroxyphenyl)-methanes with phosgene and/or with dichloroformate esters of such a mixture of isomeric di(hydroxyphenyl)-methanes with phosgene and/or with dichloroformate esters thereby that the mixture of isomeric di(hydroxyphenyl)-methanes is composed of 80-40% by weight of 4,4'-di(hydroxyphenyl)-methane, 20-65% by weight of 2,4'-di(hydroxyphenyl)-methane and 0-10% by weight of 2,2'-di(hydroxyphenyl)-methane.

Also according to the present invention, the linear polycarbonates obtained by the above condensation reaction may be insolubilized in organic solvents by heating them in an oxygen containing atmosphere.

The highly polymeric, easily soluble, thermoplastic, linear polycarbonates of the present invention can be prepared by introducing phosgene into an aqueous solution of alkaline metal salts of a mixture as hereinbefore defined of isomeric di(hydroxyphenyl)-methanes preferably in the presence of organic solvents inert to the reactants and to the products and in the presence of catalytic amounts of onium compounds.

Polycarbonates according to the invention can also be prepared by condensation of di-chloroformate esters of a mixture as hereinbefore defined of isomeric di(hydroxyphenyl)-methanes, (dissolved e.g., in an organic solvent which is immiscible with water and inert to the reactants and to the products), with an aqueous solution of about equimolar proportions of alkali metal salts of an identical or similar mixture of isomeric di(hydroxyphenyl)-methanes, preferably in the presence of catalytic amounts of onium compounds.

The reaction with alkali metal salts of a mixture of isomeric di(hydroxyphenyl)-methane with phosgene or with dichloroformate esters of such an isomeric mixture is preferably carried out in the presence as catalyst of one or more onium compounds such as quaternary ammonium compounds, tertiary sulfonium compounds, quaternary phosphonium compounds and quaternary arsonium compounds. These catalysts are preferably used in amounts between 0.01 and 5%, calculated on the weight of the alkali diphenates used. The most effective catalysts are soluble in the aqueous phase as well as in the organic phase and may be added to the reaction mixture before, during or after mixing of the two phases.

The polycondensation reaction may be carried out at temperatures between −10° C. and the boiling point of the organic solvent used.

Water is used as the solvent for the alkali metal salts and halogenated hydrocarbons such as e.g., methylene chloride, chloroform, 1,2-dichloroethane, 1,1,2-trichloroethane, sym-tetrachloroethane, methylchloroform and dichloroethylene as solvent in the reaction mixture. Other water-immiscible solvents can be used in combination with the halogenated hydrocarbons, such as benzene, toluene, etc.

In carrying out a polycondensation reaction according to the invention, the mixture of isomeric di(hydroxyphenyl)-methanes can be used in conjunction with other diphenols such as 2,2-di(4-hydroxyphenyl)-propane (Bisphenol A). Likewise the phosgene can be used in conjunction with thiophosgene and/or diacid halides of dicarboxylic acids and/or diacid halides of aromatic disulfonic acids and/or diacid halides of aromatic monocarboxysulfonic acids.

The highly polymeric, easily soluble, thermoplastic, linear polycarbonates of the present invention contain:

(A) 80-40% by weight of structural units of the formula

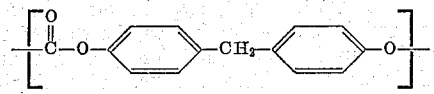

(B) 20-65% by weight of structural units of the formula

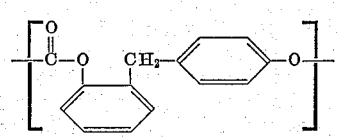

(C) 0-10% by weight of structural units of the formula

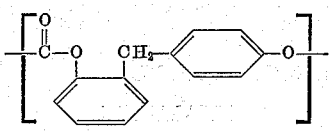

A mixture of isomeric di(hydroxyphenyl)-methanes for use in a polycondensation reaction according to the invention can be obtained by reacting formaldehyde with an excess of phenol in the presence of an acidic catalyst. The reaction product obtained consists of about 44% by weight of 4,4'-di(hydroxyphenyl)-methane, 53% by weight of 2,4'-di(hydroxyphenyl)-methane, and 3% by weight of 2,2'-di(hydroxyphenyl)-methane. The melting point of the mixture of isomers is about 100–110° C. and the yield of the reaction is approximately 70%.

The mixture of isomers so obtained can be used directly in the polycondensation reaction for manufacturing polycarbonates according to this invention.

A particular advantage of the invention is the low cost price of the starting materials. Another advantage is apparent from the following. In manufacturing a mixture of isomers by reacting phenol and formaldehyde, there is obtained, in addition to the (about 70%) yield of mixture of isomers, also about 30% of a prepolymer of the phenol-formaldehyde type, which can be worked up to phenol-formaldehyde moulding powders.

It is a further advantage of the present invention that highly polymeric linear polycarbonates are obtained which are soluble in low boiling organic solvents. They are soluble in halogenated hydrocarbons such as methylene chloride, chloroform, 1,2-dichloroethane, sym.-tetrachloro-ethane, methylchloroform, 1,1,2-trichloroethane, dichloroethylene and in tetrahydrofurane.

From solutions in methylene chloride or other solvents the polycarbonates can be cast into colourless, transparent fibres, films and other shaped articles. By stretching the films, their mechanical properties can be greatly enhanced.

Heating in an oxygen containing atmosphere at temperatures between 200 and 350° C. of films or other articles shaped from the new polycarbonates renders the articles insoluble in organic solvents. Probably a cross-linking reaction occurs which possibly can be attributed to the reactivity of the activated methylene group situated between the two aromatic rings.

Usually, amorphous oriented packaging film when heated at a temperature sufficiently high to cause appreciable shrinkage, has a tendency to become sticky at these temperatures. Upon heating under tension in an oxygen atmosphere a stretched film manufactured from the polycondensates according to the invention, a cross-linking reaction takes place at the surface of the film. Consequently when during its use as a shrinkable packaging film, the film is exposed to high temperatures, it will shrink without sticking to the wrapped object.

The polycarbonates produced from the mixture of isomers according to the invention have yet another very exceptional property. They show a very high elongation at break amounting to ca. 250%. The highest elongation at break for polycarbonates hitherto known amounts only to 180%.

Due to the fact that the polycarbonates of the present invention are thermoplastic, they can be worked up from the melt into useful shaped articles by applying fabrication techniques known in the art such as pressing, moulding or vacuum-forming.

The polycarbonates obtained from mixtures of isomers according to the invention are especially useful in photographic applications. They can for instance be used in the manufacture of film base, as an adhesive layer, as a subbing layer between the photographic light-sensitive emulsion layer and the film base, as a binder in filter layers, anti-stress layers, antistatic layers, as a binder on electrophotographic coatings, as a base and a binder for magnetic recording tape and as a binder in the manufacturing of thermoplastic recording tape.

The following examples illustrate the present invention. The instrinsic viscosity values $[\eta]$ are measured in sym.-tetrachloroethane at 25° C.

EXAMPLE 1

A. Preparation of the mixture of isomeric di(hydroxyphenyl)-methanes

To a mixture of 1169 g. of phenol and 200 ml. of formol (commercially available solution) and at a temperature below 20° C. are added 15 ml. of strong hydrochloric acid. To be sure the reaction is started, the homogeneous solution is warmed to 20° C. Whilst cooling again to below 20° C., the solution is saturated with dry gaseous hydrochloric acid of which 136 g. are absorbed. The clear green solution obtained is kept for 5 days at room temperature and thereafter extracted with 1.5 litres of water. This reaction step is repeated with 500 ml. of a 10% solution of sodium bicarbonate. After separation, the oily organic layer is dried over solid sodium bicarbonate and calcined sodium sulfate. The mixture of isomeric di(hydroxyphenyl)-methanes obtained is distilled under vacuo. At 1 mm. and 200–220° C. 340 g. of product distills over which corresponds to a yield of 68%. Melting point 100° C. The product is again distilled at 216–220° C./2 mm. and recrystallized from 1.5 litres of toluene. Melting point 108° C.

Analysis of $C_{13}H_{12}O_2$: C calculated, 78.0%. Found: 77.9%. H calculated: 6.0%. Found: 6.0%. O calculated: 16.0%. Found: 16.2%.

The mixture of isomers obtained is composed of 44% by weight of 4,4'-di(hydroxyphenyl)-methane, 53% by weight of 2,4'-di(hydroxyphenyl)-methane and 3% by weight of 2,2'-di(hydroxyphenyl)-methane.

B. Preparation of the polycarbonate 10.013 g. of the mixture of isomeric di(hydroxyphenyl) methanes prepared according to A are dissolved in 106 ml. of N sodium hydroxide (an excess of 5%). To this solution are added 80 mg. of triphenylbenzyl phosphonium chloride and 70 ml. of methylene chloride. Whilst stirring and at —5° C., 3.5 ml. of liquid phosgene are added thereto which is introduced in gaseous form within 7 minutes. The temperature rises to 0° C. The reaction mass becomes very viscous and stirring is continued for 1 hour at 0° C. Thereafter the reaction product is washed with water and precipitated with ethanol. $[\eta]=0.85$ dl./g.

EXAMPLE 2

A. Preparation of the dichloroformate esters of the mixture of isomeric di(hydroxyphenyl)-methanes 100 g. of the mixture of isomeric di(hydroxyphenyl) methanes prepared according to Example 1A are suspended in 400 ml. of pure trichloroethane. 110 g. of phosgene are introduced at a temperature of about 10° C. Whilst continuously cooling down to about 10° C., 80 ml. of pyridine dissolved in 100 ml. of trichloroethane are then added dropwise. The reaction is strongly exothermic. First a yellow precipitate is formed which slowly dissolves. Dissolution is complete after 1 hour of stirring. The yellow solution is kept overnight at room temperature and thereafter desiccated under vacuum. The crystalline residue is boiled three times with 500 ml. of hexane. The hexane extract is concentrated and distilled under vacuum. Boiling point of the residue is 181–190° C./1 mm. Yield: 132 g. or 81%. After distilling again the residue, the boiling point becomes 171–176° C./0.5 mm.

B. Preparation of the polycarbonate 7.610 g. of the mixture of isomeric di(hydroxyphenyl) methanes are dissolved in 70 ml. of 0.984 N sodium hydroxide which constitutes an excess of 2%. To this solution are added 70 mg. of triphenylbenzyl phosphonium chloride and 30 ml. of pure methylene chloride. Whilst vigorously stirring and at 0° C. a solution of 12.495 g. of the dichloroformate (prepared according to Example 2A) (an excess of 1%) in 50 ml. of methylene chloride is dropwise added. The mixture immediately becomes very viscous and in 1 hour the temperature is allowed to rise to room temperature whilst stirring. The polymer solution which settles in the bottom layer is washed with distilled water and precipitated with hot water. $[\eta]=1.05$ dl./g.

EXAMPLE 3

According to the method described in Example 1B, phosgene is introduced in an alkaline solution of a mixture of isomeric di(hydroxyphenyl)-methanes composed of 98% by weight of 4,4'-di(hydroxyphenyl)-methane and 2% by weight of 2,4'-di(hydroxyphenyl)-methane. These percentages lay outside the limits within which according to the invention polycarbonates are obtained which are soluble in low boiling solvents and have useful properties. The polycarbonate obtained is unsoluble in methylene chloride.

Films manufactured from this polycarbonate are so brittle that it is impossible to measure their mechanical properties such as their modulus of elasticity, their elongation at break, and the like.

EXAMPLE 4

According to the method described in Example 1B phosgene is introduced in the alkaline solutions of two mixtures of different composition of isomeric di(hydroxyphenyl)-methanes. The composition of these two mixtures and the properties of films manufactured from the polycarbonates obtained are listed in the following table.

thick at a temperature of 200° C. and under a pressure of 1600 kg./sq. cm. When these plates are immersed in methylene chloride they completely dissolved after 15 min.

In an atmosphere, which is kept at constant temperature by vapors of a boiling liquid, these plates are subjected to the action of aerial oxygen, whereupon they are extracted for 2 h. with methylene chloride. After drying, the undissolved part is weighed and the dissolved part is precipitated by pouring into ethanol. After drying, the intrinsic viscosity of the latter is measured. The following table lists the results for different treatment periods at different temperatures.

| Temperature in ° C | Reaction period in min. | Percent undissolved | [η] |
|---|---|---|---|
| 282 | 60 | 100 | |
| 282 | 30 | 10.8 | 0.50 |
| 282 | 5 | 9.6 | 1.22 |
| 255 | 60 | 13.9 | 0.58 |
| 180 | 60 | 2.6 | 0.88 |

| | Composition of mixtures of isomers in percent by weight | | Solubility in CH₂Cl₂ | Properties | | | | | |
|---|---|---|---|---|---|---|---|---|---|
| | 4,4' | 2,4' | | [η] dl./g. | Softening point in ° C. | Modulus of elasticity in kg./sq. mm. | Yield strength in kg./sq. mm. | Tensile strength in kg./sq. mm. | Elongation in percent |
| 1 | 76 | 24 | Soluble | 0.64 | 95 | 185 | 5.3 | 4.6 | 11 |
| 2 | 55 | 45 | do | 0.84 | 80 | 221 | 6.1 | 5.2 | 10 |

EXAMPLE 5

According to the method described in Example 2B, mixtures of different compositions of isomeric di(hydroxyphenyl)-methanes are reacted in an alkaline solution with the dichloroformates of the same mixtures of isomers dissolved in methylene chloride. The composition of these mixtures and the properties of films manufactured from the polycarbonates obtained are listed in the following table.

If a same plate is subjected for 10 min. to a nitrogen current at 282° C., thus in the absence of oxygen, the plate remains completely soluble in methylene chloride. It appears therefrom that the insolubilization by a moderate thermic treatment is a surface phenomenon which is promoted by the presence of oxygen.

| | Composition of mixtures of isomers in percent by weight | | | Solubility in CH₂Cl₂ | Properties | | | | | |
|---|---|---|---|---|---|---|---|---|---|---|
| | 4,4' | 2,4' | 2,2' | | [η] in dl./g. | Softening point in ° C. | Modulus of elasticity in kg./sq. mm. | Yield strength in kg./sq. mm. | Tensile strength in kg./sq. mm. | Elongation in percent |
| 1 | 77 | 23 | | Soluble | 1.14 | 100 | 183 | 5.3 | 5.3 | 162 |
| 2 | 65 | 29 | 6 | do | 1.8 | 100 | 212 | 5.4 | 5.4 | 159 |
| 3 | 60 | 40 | | do | 1.05 | 95 | 220 | 5.7 | 5.5 | 236 |
| 4 | 55 | 45 | | do | 1.08 | 90 | 204 | 5.6 | 5.1 | 146 |
| 5 | 40 | 53 | 7 | do | 1.2 | 90 | 234 | 6.0 | 5.6 | 234 |

EXAMPLE 6

From a mixture of isomers of di(hydroxyphenyl)-methanes consisting of 40% by weight of 4,4'-di(hydroxyphenyl)-methane, 53% by weight of 2,4'-di(hydroxyphenyl)-methane and 7% by weight of 2,2'-di(hydroxyphenyl)-methane, a polycarbonate is manufactured according to the method described in Example 1B. The polycarbonate obtained is pressed into plates of 1 mm.

EXAMPLE 7

Film strips of about 0.06 mm. thickness are cast from a solution in methylene chloride of a polycarbonate prepared according to the method described in Example 1B. In a ventilated oven, these film strips are freely hung up. From the same solution films are cast on a glass plate and placed in the oven, so that only one side of the film is in contact with the air. The results of measuring tests are listed in the following table.

| Temperature in ° C. | Time in min. | Number of sides exposed to the air | Percent undissolved | Properties | | | | |
|---|---|---|---|---|---|---|---|---|
| | | | | Softening point in ° C. | Modulus of elasticity in kg./sq. mm. | Yield strength in kg./sq. mm. | Tensile strength in kg./sq. mm. | Elongation in Percent |
| 250 | 10 | 1 | 78 | 110 | 224 | 6.5 | 5.5 | 6.8 |
| 250 | 10 | 2 | 100 | 110 | 244 | 7.0 | 6.6 | 5.4 |

I claim:

A high molecular weight linear polycarbonate resin of carbonic acid and a dihydric phenol, said dihydric phenol consisting essentially of a mixture containing 80–40% of 4,4'-di(hydroxyphenyl)-methane, 0–10% of 2,2'-di(hydroxyphenyl)-methane, and the remainder to total 100% of 2,4'-di(hydroxyphenyl)-methane, all percentages being by weight, said resin having a softening point not higher than about 110° C.

References Cited by the Examiner
UNITED STATES PATENTS

| | | | |
|---|---|---|---|
| 2,950,266 | 8/60 | Goldblum | 260—47 X |
| 2,964,797 | 12/60 | Peilstocker | 260—47 |
| 3,021,305 | 2/62 | Goldberg | 260—47 |

WILLIAM H. SHORT, *Primary Examiner.*

LOUISE P. QUAST, *Examiner.*